(12) United States Patent
Pautler

(10) Patent No.: US 10,782,096 B2
(45) Date of Patent: Sep. 22, 2020

(54) SKEET AND BIRD TRACKER

(71) Applicant: James Anthony Pautler, Plano, TX (US)

(72) Inventor: James Anthony Pautler, Plano, TX (US)

(*) Notice: Subject to any disclaimer, the term of this patent is extended or adjusted under 35 U.S.C. 154(b) by 2 days.

(21) Appl. No.: 16/078,185

(22) PCT Filed: Feb. 24, 2017

(86) PCT No.: PCT/IB2017/051103
§ 371 (c)(1),
(2) Date: Aug. 21, 2018

(87) PCT Pub. No.: WO2017/145122
PCT Pub. Date: Aug. 31, 2017

(65) Prior Publication Data
US 2019/0056198 A1 Feb. 21, 2019

Related U.S. Application Data

(60) Provisional application No. 62/299,384, filed on Feb. 24, 2016.

(51) Int. Cl.
| | |
|---|---|
| *F41G 1/473* | (2006.01) |
| *F41G 3/26* | (2006.01) |
| *F41G 3/06* | (2006.01) |
| *G01C 3/02* | (2006.01) |

(52) U.S. Cl.
CPC .............. *F41G 1/473* (2013.01); *F41G 3/06* (2013.01); *F41G 3/065* (2013.01); *F41G 3/2605* (2013.01); *G01C 3/02* (2013.01)

(58) Field of Classification Search
None
See application file for complete search history.

(56) References Cited

U.S. PATENT DOCUMENTS

| | | | | |
|---|---|---|---|---|
| 4,787,291 | A | | 11/1988 | Frohock, Jr. |
| 5,194,006 | A | * | 3/1993 | Zaenglein, Jr. ........ F41G 3/2694 434/19 |
| 5,641,288 | A | * | 6/1997 | Zaenglein, Jr. ........ F41G 3/2633 434/17 |
| 5,991,043 | A | | 11/1999 | Andersson et al. |
| 2006/0005447 | A1 | * | 1/2006 | Lenner ..................... F41G 3/06 42/111 |
| 2011/0311949 | A1 | * | 12/2011 | Preston .................... F41G 3/26 434/16 |

(Continued)

FOREIGN PATENT DOCUMENTS

GB 2439744 A 1/2008

OTHER PUBLICATIONS

EP Search report issued in the corresponding EP Application No. 17755933.3, dated Sep. 25, 2019.

*Primary Examiner* — Christle I Marshall

(57) ABSTRACT

A device receives an initial velocity of a projectile, determines a barrel position and a barrel orientation of a barrel, determines a target position, a target velocity and a projected target trajectory in relation to the barrel position and barrel orientation, determines a lead position in front of the projected target trajectory of an interception of the projectile at the target and presents the lead position to a user device.

21 Claims, 6 Drawing Sheets

(56) References Cited

U.S. PATENT DOCUMENTS

| | | | |
|---|---|---|---|
| 2014/0028856 A1* | 1/2014 | Ehrlich | F41A 17/08 348/169 |
| 2014/0272807 A1* | 9/2014 | Guenther | F41G 3/2605 434/19 |
| 2015/0276349 A1* | 10/2015 | Northrup | F41A 33/00 434/22 |
| 2016/0069643 A1* | 3/2016 | Lyren | G09B 19/0038 345/589 |
| 2016/0084617 A1* | 3/2016 | Lyren | F41G 3/08 42/135 |
| 2019/0186876 A1* | 6/2019 | Howe | G09B 5/02 |

\* cited by examiner

SKEET AND BIRD TRACKER

CROSS-REFERENCE TO RELATED APPLICATIONS

The present application claims priority to earlier filed provisional application No. 62/299,384 filed Feb. 24, 2016 and entitled SKEET AND BIRD TRACKER, the entire contents of which are hereby incorporated by reference.

BACKGROUND

The present disclosure is in the technical field of shooting sports. More particularly, the present disclosure is in the technical field of shooting moving targets. There are many shooting sports that involve moving targets, including bird hunting, skeet, and trap. Shooting moving targets requires the shooter to lead the target for a proper hit. The proper target lead is dependent on many factors, including, but not limited to, initial target velocity, target direction, target range, initial shot velocity, and the ballistics of the shot and target. Shooters typically learn proper target lead through a process of trial and error. The input to this learning process after each shot is either a hit result or a miss result. Unfortunately, many beginners to skeet shooting are unable to hit a single target after dozens of shots. Receiving only miss results, the beginner is not able to begin a successful learning process. These frustrated beginners give up on the sport because they fail to establish a proper target lead.

On the other end of the experience spectrum, advanced shooters almost always receive hit results. These shooters have a difficult time improving further since they are not able to differentiate between center hits and moderately off-center hits. There are a number of training aids that have been devised to help estimate the proper target lead. One type of aid is a physical modification to the sights that presents a fixed lead estimate to the shooter. This estimate is only valid under specific conditions, such as a controlled skeet launch and a specific shooting station. However, variations in the specific skeet launch can invalidate the assumptions used to set the estimated lead. Also, these aids do not provide additional feedback to the shooter after the shot.

Another type of training aid is tracer ammunition. Tracer ammunition makes the actual shot visible to the shooter. This gives the shooter some indication of the direction of a miss, but there are also ambiguous indications. For instance, a miss can first present the shot in front of the target. A fraction of a second later, the shot can be presented behind the target. This ambiguity makes it difficult for the shooter to determine if they had too much or too little lead.

Video analysis is another method to provide post-shot feedback to the shooter. This type of feedback is similar to using tracer ammunition, except that the feedback can be slowed down and analyzed repeatedly. Video collected before and after the shot is examined by the shooter to recreate the experience of the shot for the shooter. Unfortunately, video analysis suffers from the same ambiguity as the use of tracer ammunition. Further, the feedback received through video analysis still requires the use of trial and error to determine the proper lead.

BRIEF SUMMARY

An optical tracking device that is mounted to a shooting device is disclosed. The optical tracking device captures and analyzes a target trajectory and presents the shooter with a very accurate analysis of the hit or miss pattern.

In one embodiment, a method comprises receiving an initial velocity of a projectile, determining a barrel position and a barrel orientation of a barrel, determining a target position, a target velocity and a projected target trajectory in relation to the barrel position and barrel orientation, determining a lead position in front of the projected target trajectory of an interception of the projectile at the target and presenting the lead position to a user device.

In another embodiment, a computing device comprises a processor and a memory operably coupled to the processor, wherein the processor is configured to receive an initial velocity of a projectile, determine a barrel position and a barrel orientation of a barrel, determine a target position, a target velocity and a projected target trajectory in relation to the barrel position and barrel orientation, determine a lead position in front of the projected target trajectory of an interception of the projectile at the target, and present the lead position to a user device.

In a further embodiment, a non-transitory computer readable medium having computer-executable instructions that when executed by a processor cause the processor to perform receiving an initial velocity of a projectile, determining a barrel position and a barrel orientation of a barrel, determining a target position, a target velocity and a projected target trajectory in relation to the barrel position and barrel orientation, determining a lead position in front of the projected target trajectory of an interception of the projectile at the target and presenting the lead position to a user device.

In yet another embodiment, a method, comprises receiving an initial velocity of a projectile, determining a barrel position and a barrel orientation of a barrel, determining a shot pattern of the projectile in relation to at least one of time and distance and presenting the shot pattern to a user device.

In yet a further embodiment, a computing device comprises a processor and a memory operably coupled to the processor, wherein the processor is configured to receive an initial velocity of a projectile, determine a barrel position and barrel orientation, determine a shot pattern of the projectile in relation to at least one of time and distance and present the shot pattern to a user device.

DETAILED DESCRIPTION

Figure 1A:
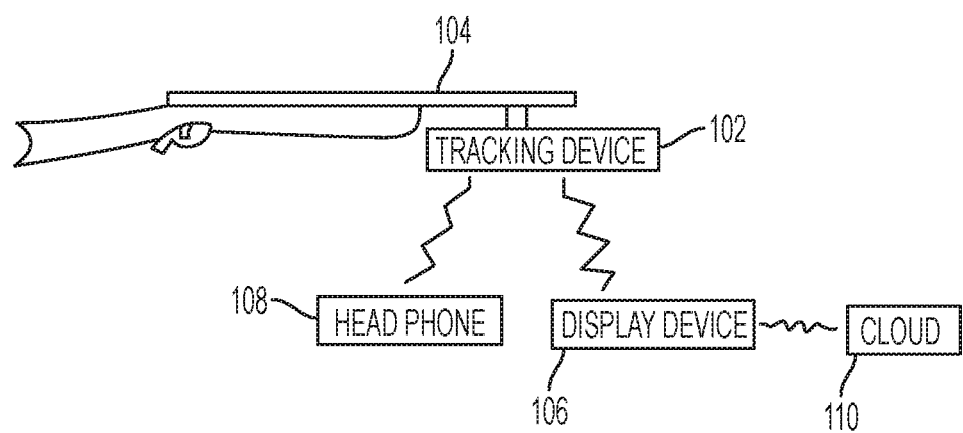
FIG. 1a is a diagram showing a tracking device interfaced to a shooting device and various presentation and storage devices according to an embodiment of the instant disclosure.
Figure 1B:
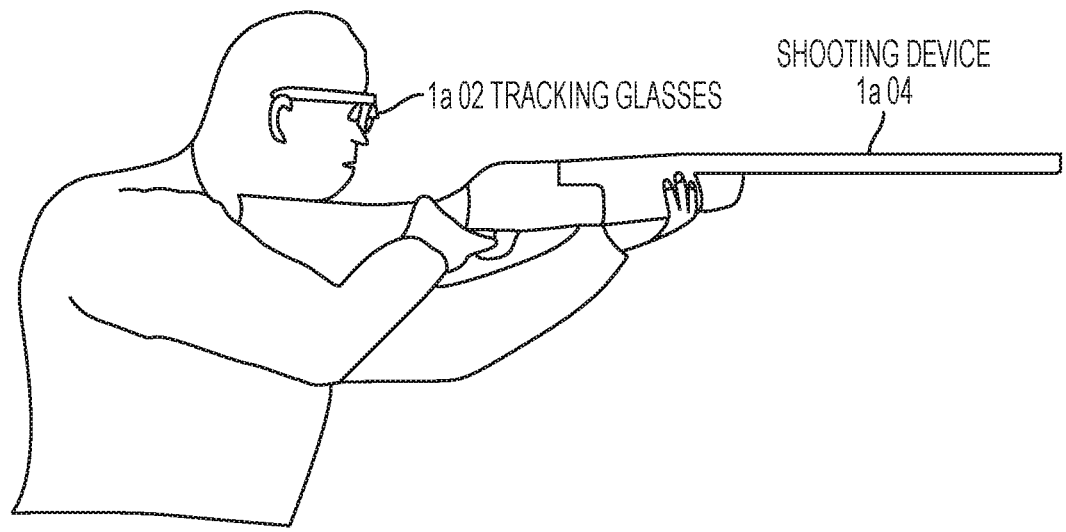
FIG. 1b is a diagram showing the tracking device operating as part of a separate set of glasses or headset according to an embodiment of the instant disclosure.

Referring now to FIG. 1 there is an optical tracking device 102 that is mounted to a shooting device 104. The tracking device is aligned to the shooting device so that it has knowledge of the axis and parallax offsets that should be corrected by assuming or measuring, or having the user input the distance from the lens to the center of the barrel. The device is aligned to the boresight of the gun using a laser, selecting an aim point on the display, aiming at a target at a fixed range, or use of a boresighting device inserted into the barrel visible to the device. The tracking device will analyze the target and present the results to at least one of a display device 106 and/or an audio headphone 108 that provides feedback to the shooter in real-time or near real-time on how to improve the shot. The feedback can be presented similar to FIG. 4 where the target location relative to the shot pattern is displayed. In addition to the visual feedback, an audio feedback can be played telling the shooter where the center of the pattern is in relation to the target. For example, it could play "Eight Inches to the Left" if the shot center was 8 inches behind a rightward moving target. The display device 106 will also, in one embodiment, provide an internet connection via built in Wi-Fi or cellular based such as a 4G connection, or via wireless or wired connection to a device connected to the internet to the "Cloud" 110 for storage and social media applications.

In FIG. 1a, a separate tracking device such as a camera, gyro, display and processor mounted within or on a set of glasses 1a02 is worn by the shooter. The shooting device 1a04 is tracked along with the target so that all of the relevant coordinate transformations can be performed. The glasses may also contain the display in the form of a semitransparent screen such as an LCD, projection onto the glasses lens, projection onto the user's retina, hologram, reflection of a display on a semitransparent screen in the user's line of sight, or any other device containing a processor and memory that can provide the feedback to the shooter after the shot.

Figure 2:
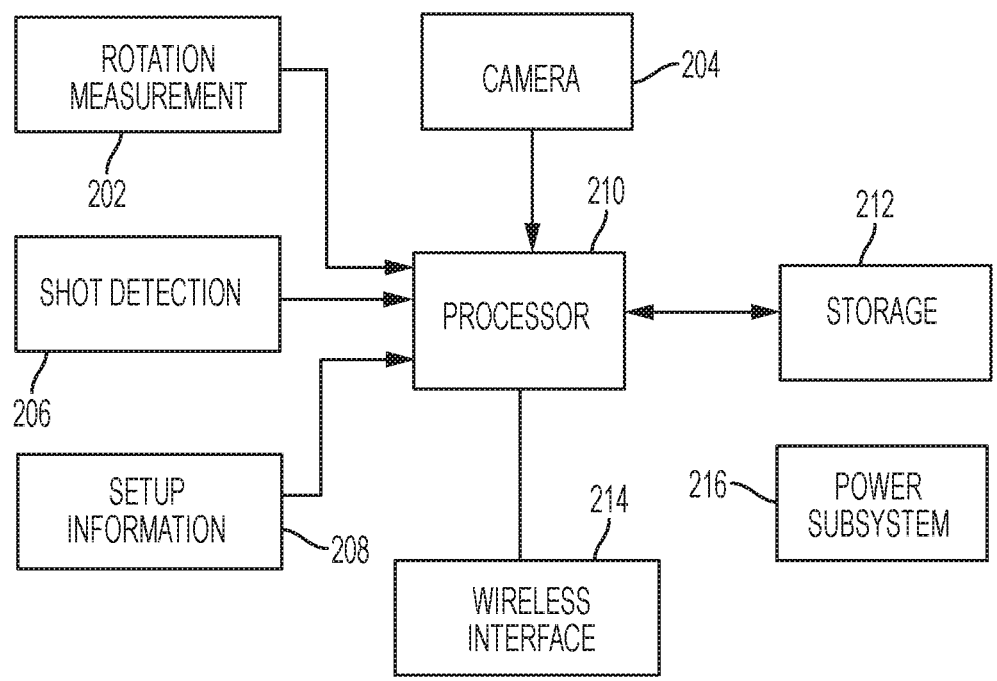
FIG. 2 is a diagram expanding the tracking device major functions according to an embodiment of the instant disclosure.

FIG. 2 is an expansion of the optical tracking device. A rotation measuring device 202 is constantly sampling and storing information in a rotating buffer where several seconds of data can be retrieved, when enabled by the user either through a button, voice command, specific gun orientation, or gun motion or series of motions, or remotely from the external device such as a tablet or cell phone. In addition, a camera 204 is continually taking images and also storing them in a rotating buffer where the last N photos can be retrieved. When the shot detection function 206 detects that a shot has been fired by measuring a sudden acceleration of the gun in the axis of the barrel via an accelerometer or gyroscope, measuring the angular rates via a gyroscope, sensing an abrupt shift in the image via subsequent image comparisons, measuring the loud sound through a speaker or pressure transducer, strain gauge on the gun, observation of the gun action, or any combination of these, the processor 210 will retrieve the contents of the rotation measurement and the image storage buffers 212. The processor 210 will then perform a trajectory analysis using the setup information 208 and the image and rotation data by using the inertial gun rate and data from the images to calculate the target relative rate with respect to the camera as well as range. The target inertial rotational velocity is calculated and used along with range to determine the angle the target with travel before the projectile crosses its path. This angle is compared to the angle of the shot pattern as defined by the choke but could be a linear distance if linear rates and distances are used to define the impact location. The results of this process are exported for presentation to the user's device (herein described as the user or the user's device) via a wireless interface 214, such as Bluetooth, WiFi, or cellular. The data could also be displayed on a screen attached to the device, through headphones connected to the device or a speaker on the device, or through a USB, HDMI, and VGA, Ethernet or other connection to a display or additional device.

Figure 3A:
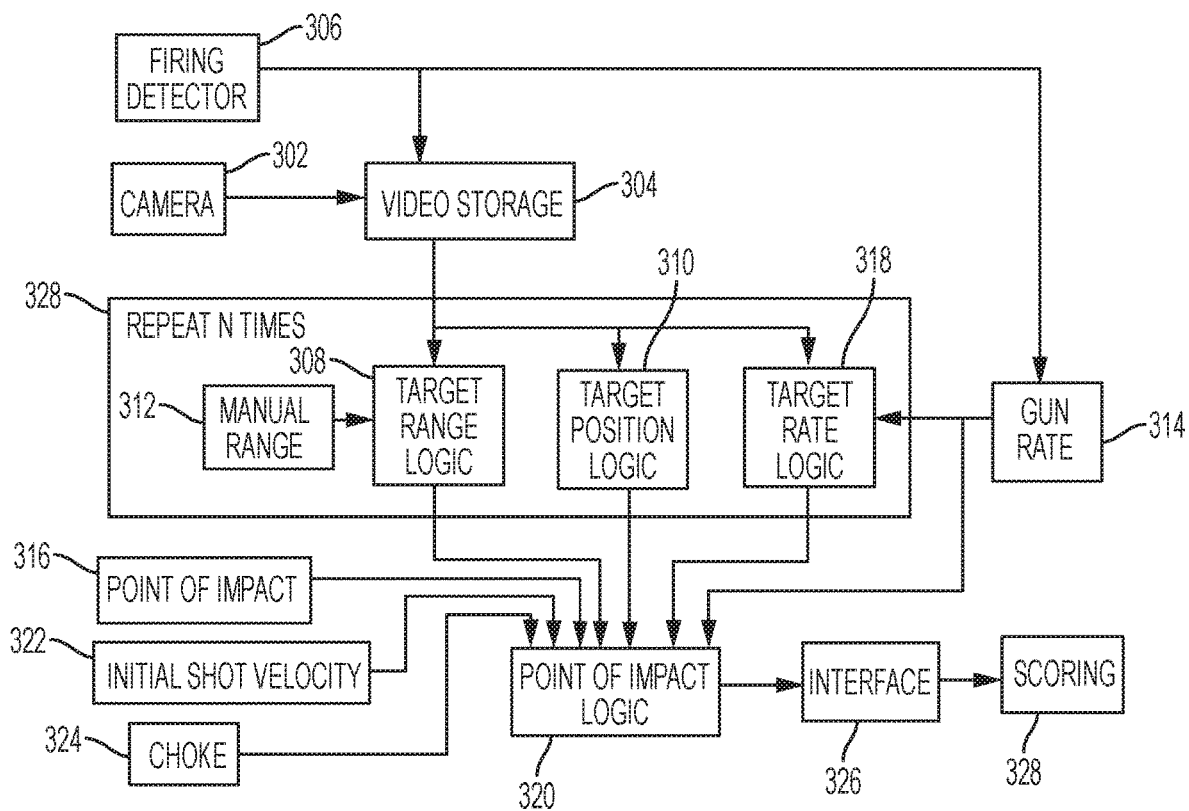
FIG. 3A is a flow chart showing steps that the invention executes according to an embodiment of the instant disclosure having target tracking.

In FIG. 3A, a camera 302 records images or video (continuously or intermittently) while enabled. These images or videos are stored in memory 304. Recording can be enabled by activating a button or switch, when the gun senses it is pointed at or above the horizon based on accelerometer measurements, a shake or tap or other defined motion (such as a tilt, roll, or series of motions) based on gyro or accelerometer measurements, by a pressure sensitive switch in the gun buttstock, or sensing the closure of the action based on gyro or accelerometer measurements, verbally via a microphone, a timer initiated by the device or a connected device, or by synchronizing with a target throwing machine. When the firing detector 306 senses the discharge of the shooting device, a number of images (N) are extracted from memory and passed to the target range logic 308 and target position logic 310. Typically this will be the two images collected just before discharge, however prior images may be used especially if the target is not located in one of the images or if the range or velocity estimate is outside a predefined bound. Target range logic 308 is performed in processor 210 on all or some of the extracted images and/or manual range to produce an estimate of the range to the target. If range is measured using radar or LIDAR, or other direct measurements, the images may not need to be used.

Optionally, range logic 308 can be an automatic or manual or fixed operation. If automatic, the logic can use knowledge of the target such as size to determine range. Other methods of determining range could include radar, sonar, stereo or more images, LIDAR, laser range finding, or estimation of range based on time of flight of a clay pigeon knowing initial velocity and launch angle and initial position from device. If the automatic process fails to determine the range to target or estimates the wrong range as determined by a predefined maximum and minimum range or by user input, the user can override the range with a manual input 312 or the system could use a default or most likely range estimate based on time of flight and user location and target initial location and velocity or from the geometry of the area around the user. If manually entered, the user would enter the range to target which could be around the time of discharge or later. The user estimate of range can be aided by displaying targets at known distances for reference by including appropriately scaled images of the targets at various ranges in the display. If the range is neither automatically determined nor manually entered, a predetermined single range or series of ranges can be used based on default ranges programmed into the device or as default ranges based on what game is played such as skeet or trap and or knowledge of where the user is located on the range.

Target position logic 310 is performed in processor 210 on all, some, or none (none if the target position is determined by non-optical means such as a radar or LIDAR) of the extracted images to produce an estimate of the target position. If target location is measured using radar or LIDAR, or other direct measurements, the images may not need to be used. Optionally, 310 can be an automatic or manual operation. If automatic, the logic searches the image for the intended target. If the target is ambiguous, for example, multiple targets or the logic is unable to detect a target, the user can select the intended target for the boresight offset. If the automatic process fails to select the correct target, the user can override the selection and choose the target through the remote interface or a keypad or touchscreen on the device.

The rotational rates of the gun can be measured in 314 using a gyroscope, GPS, measuring the relative rate of the gun compared to another frame of reference for example, measuring the rate of the gun using data from a stationary camera located on the ground, or on a moving camera whose own rate is known mounted in the shooter's glasses or on their body or headgear. In the preferred embodiment, the direct output of a gyroscope is used to measure at least one dimension of rotational rate largely coinciding with the movement of the target. Measuring a second dimension significantly improves impact prediction accuracy in cases where the movement of the target does not largely coincide with the first dimension. Measuring more than two dimensions marginally improves the impact prediction accuracy if the shooter rotates the gun around the axis of the barrel.

The rate of the target is measured in the preferred embodiment using changes in target location over time in a series of images in target rate logic 318 which can be an inertial linear velocity, angular velocity relative to the camera or gun, or inertial angular velocity. Target rate logic 318 is performed in processor 210 using the rotation rates of the gun and the extracted images to produce an estimate of the target inertial rate. The relative angular velocity of the target can be measured by comparing two or more successive images to determine how many pixels the target moved in a given time. The angular velocity is the number of pixels multiplied by the angle represented by each pixel. The target inertial rate can be found by adding the inertial rate of the camera to the measured relative rate. The target rate can optionally be measured using a camera that is stationary on the ground, radar, sonar, stereo imaging, LIDAR, or laser range finding.

The point of impact of the shot logic 320 is performed in processor 210 and uses the inertial rate of the gun, range to target, initial velocity of the projectile 322, and optional choke 324 if the shooting device is a shotgun. The result is the position of the target and the shot relative to the point of aim at the moment that the target and the shot are both at the same distance from the shooter. This would correspond to the moment of impact if the shot hits the target. The point of aim 316 is the measured aim point or measured projectile trajectory at a known range on the image. When the camera and gun are not co-located, the point of aim 316 is adjusted based on gun position and orientation which determines the direction the gun is pointed and the parallax. The gun position and orientation can be measured optically using reference points on the gun or using RF beacons mounted to the gun and the angle of the gun would determine the change in offset of the reticle on the display.

The logic assumes the trajectory of the target is a circle or circles of fixed radius which is the range or ranges and at constant velocity. Optionally the trajectory of the target can be estimated in a 3 dimensional coordinate system or by using a Kalman filter by using target range and angles and gun motion to find the 3d position over time. The trajectory of the shot consists of the initial orientation and initial velocity of the shooting device as well as initial velocity of the projectile. The orientation of the gun is used for determining the effects of gravity on the projectile trajectory. The orientation can be measured by means such as an accelerometer or optionally a fixed value used such as 20 degrees to cover a typical shooting scenario. The initial velocity of the projectile is a vector and therefore has 3 components, the first oriented with the axis of the barrel, the second oriented typically to the left or right of the gun, and the last oriented typically up or down. These axes are ideally orthogonal to each other, but can be oriented arbitrarily. The initial velocity in the direction of the axis of the barrel, V0, is the muzzle velocity of the shot. The initial velocity to the right or left, V0h, is the horizontal angular rate of the gun times the length of the gun. The initial velocity up or down, V0v, is the vertical angular rate of the gun times the length of the gun. The horizontal and vertical linear velocities are multiplied by the time of flight and used to compensate for shot motion due to projectile initial linear velocity. Optionally, if the initial vectors are not oriented to the left or right or up and down relative to the gun, the gun rate components corresponding to the initial vector components are used. Optionally, a length other than that of the gun can be used which may or may not enhance the accuracy of the compensation. This could happen if the shooter holds the gun far back on their shoulder which would be further from the center of rotation of their body, or if the gun length is unknown, or if only barrel length is known.

Taking all the components of the initial velocity of the projectile into consideration improves the precision of the point of impact a significant amount. This improvement provides the user with a more accurate prediction of the point of impact. This could mean the difference between predicting a hit or a miss, especially when the gun is rotating at a high angular rate. Under typical conditions, we would expect to see an angular rate of 60 deg/s for a target at 30 yards. Using a 48 inch long gun using 1100 ft/s shot, we would expect to see a linear motion at the point of impact of 4.1 inches. For a target that is 4 inches in diameter, this could indicate a miss for shots that are at the outer area of the pattern. Optionally the logic can compensate for aerodynamic effects of the shot or drop due to gravity by increasing the time of flight before impact and moving the reticle in the direction of gravity based on the equations $X=X0+V0*time+\frac{1}{2}*G*time^2$, and angle=X/range. The time it takes for the projectile to impact the target is based on the initial velocity of the shot, range to target, and optionally change in shot velocity over time and velocity of target. The logic will predict where the target will be using the location at projectile discharge, inertial rate as measured by the camera and gyro, and where the shot will be at the estimated time of impact using the using information gathered at and or before the time of discharge such as boresight of the gun to camera, muzzle velocity, and gun inertial rate. Optionally, using information based on choke used for a shotgun, the size of the pattern of the shot at the target range can be combined with the impact location to determine where the target was in relation to the pattern. Optionally the information about point of impact would be stored in memory.

Using the velocity profile of the projectile and the distance to target, the time of flight for the projectile to travel the distance to target can be calculated. Using the angular rate of the target and the calculated time of flight, the angle the target moves can be calculated. The position of the target relative to the gun is known at the time of discharge and the position of the target at the end of time of flight is calculated using the position at discharge and the movement of the target over the time of flight of the projectile. The position at the end of time of flight is compared to the gun boresight at discharge and the angular difference will determine the accuracy of the shot.

The tracking logic 328 in 308, 310, 318, and 320 can be performed on the gun near the camera. Alternatively, the logic processing can occur separate from the gun. For example, the processing may occur in an external processing unit that is worn by the shooter that sits on the ground near the shooter, that is on a smartphone carried by the shooter, or that is remote. The input to and the output from the processing unit can take place via wired or wireless means and could also traverse the internet to reach remote locations.

Any of the information from 320 is passed to a local or remote interface 326. An example of a local interface would be a screen on the device or audio originating from the device to an included speaker or through headphones. An example of a remote interface would be a device separate from the original device, cellular telephone, tablet, computer, internet, or television. The information passed to a remote interface can be stored or otherwise made optionally available for statistics and history of shots taken or sharing with others. It is optional that the information be used for scoring purposes where, for example, the position of the target in the pattern can be scored similar to rings and a bullseye on rifle target where the points increase as the target gets closer to the pattern center.

Figure 3B:
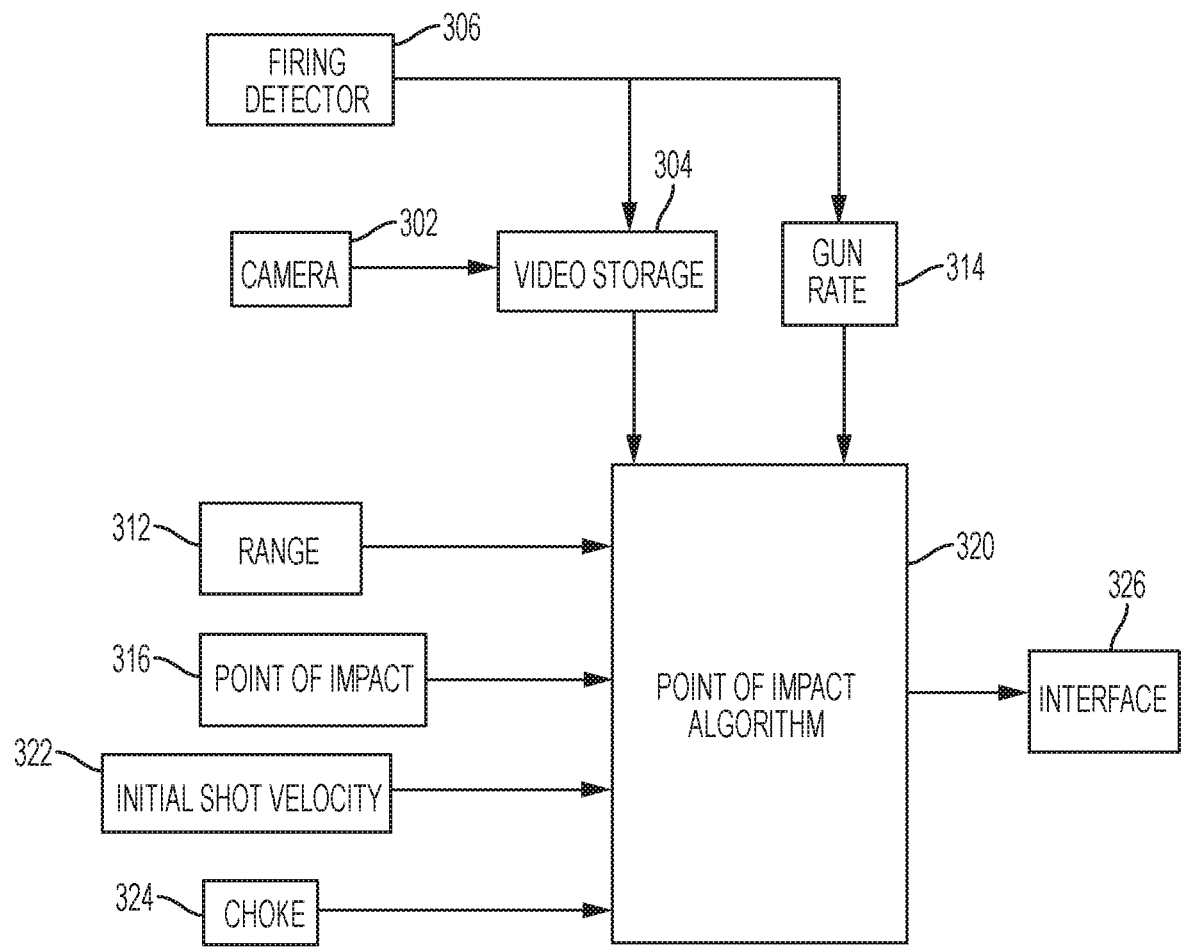
FIG. 3B is a flow chart showing steps that the invention executes according to an embodiment of the instant disclosure without target tracking.

FIG. 3B is a modification of the design shown in FIG. 3A without the tracking logic module 328. This enables hunting applications where the target is unknown to the device such as a bird. The user is presented with the video of the shot and with information about the boresight and shot pattern for self-analysis. The user then reviews the data to analyze why they may have missed their intended target.

In FIG. 3B, a camera 302 records images or video (continuously or intermittently) while enabled. These images or videos are stored in memory 304. Recording can be enabled by activating a button or switch, when the gun senses it is pointed at or above the horizon based on accelerometer measurements, a shake or tap or other defined motion (such as a tilt, roll, or series of motions) based on gyro or accelerometer measurements, by a pressure sensitive switch in the gun buttstock, or sensing the closure of the action based on gyro or accelerometer measurements, verbally via a microphone, a timer initiated by the device or a connected device, or by synchronizing with a target throwing machine. The rotational rates of the gun can be measured in 314 using a gyroscope, GPS, measuring the relative rate of the gun compared to another frame of reference for example, measuring the rate of the gun using data from a stationary camera located on the ground, or on a moving camera whose own rate is known mounted in the shooter's glasses or on their body or headgear.

Figure 4:
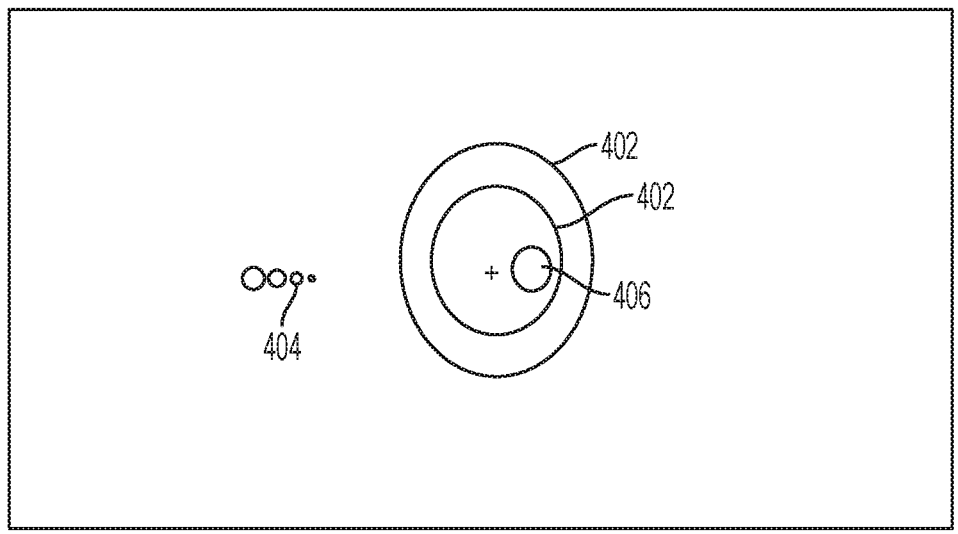
FIG. 4 shows a shot pattern analysis visible on a wireless display device according to an embodiment of the instant disclosure.

The point of impact of the shot logic 320 is performed in processor 210 and uses the inertial rate of the gun, initial velocity of the projectile 322, and optional choke 324 if the shooting device is a shotgun. The point of aim 316 is the measured aim point or measured projectile trajectory at a known range on the image. When the camera and gun are not co-located, the point of aim 316 is adjusted based on gun position and orientation which determines the direction the gun is pointed and the parallax. The gun position and orientation can be measured optically using reference points on the gun or using RF beacons mounted to the gun and the angle of the gun would determine the change in offset of the reticle on the display. The trajectory of the shot consists of the initial orientation and initial velocity of the shooting device as well as initial velocity of the projectile. Optionally the logic can compensate for aerodynamic effects of the shot or drop due to gravity by increasing the time of flight before impact and moving the reticle in the direction of gravity based on the equations $X=X0+V0*time+\frac{1}{2}*G*time^2$, and angle=$X$/range. The logic will predict a point of impact using the location at projectile discharge, inertial rate as measured by the camera and gyro, and where the shot will be at the estimated time of impact using the using information gathered at and or before the time of discharge such as boresight of the gun to camera, muzzle velocity, and gun inertial rate. Optionally, using information based on choke used for a shotgun, the size of the pattern of the shot at distance FIG. 4 shows a typical shot analysis that is presented after each shot. Two circles 402 represent where the pellets from the shot pass thru the plane of the target. The inner circle represents a solid hit where the probability of a clay break is likely >90%. The outer circle represents the outermost distance where any pellet can be. In this area the likelihood of a clay break is reduced to 0 or near-zero. The target 406 is shown projected in time from the last image at the time of the shot. The small dots 404 on the left of the display represent the last N positions of the target before the shot. The most recent being the largest of the 4. This allows the shooter to know how he is visually tracking the target just before the shot. There is a large variety of circles or reticles that can be utilized in the display that represent additional information for the shooter feedback.

Figure 5:
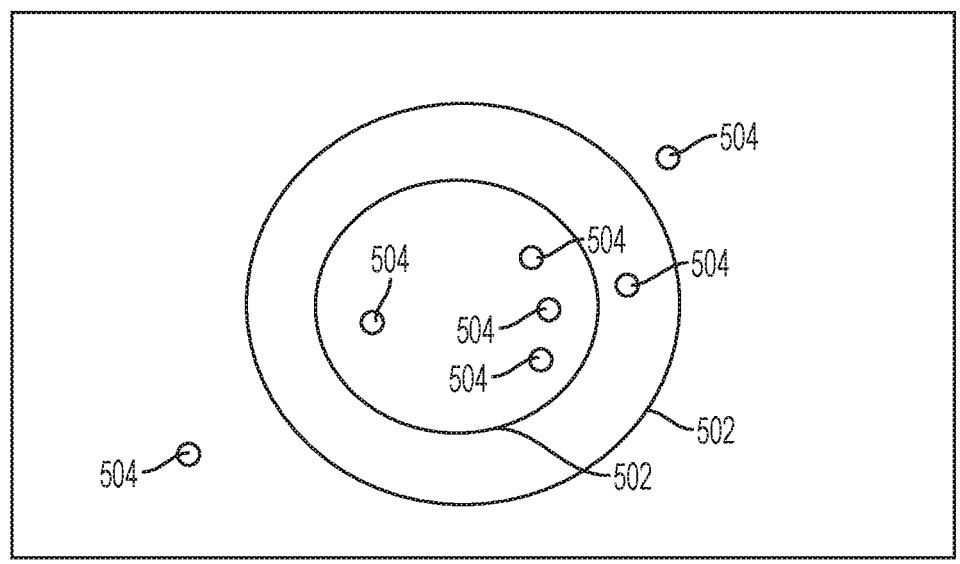
FIG. 5 show the compilation and history of the pattern analysis since a last history reset was executed according to an embodiment of the instant disclosure.

FIG. 5 is an illustration of how the history of the shots can be displayed to the shooter. When a reset of history occurs via user input or maximum number of shots in the history is reached, just the two circles 502 are present. After each shot, a dot 504 is added to the display representing where the target was relative to the shot pattern of the pellets. This will continue after each shot until the history is reset. Additional circles or reticles can also be used here which define probabilities of hits for a given choke, measured shot pattern shape, or rings which define a score based on distance away from the boresight.

Figure 6:
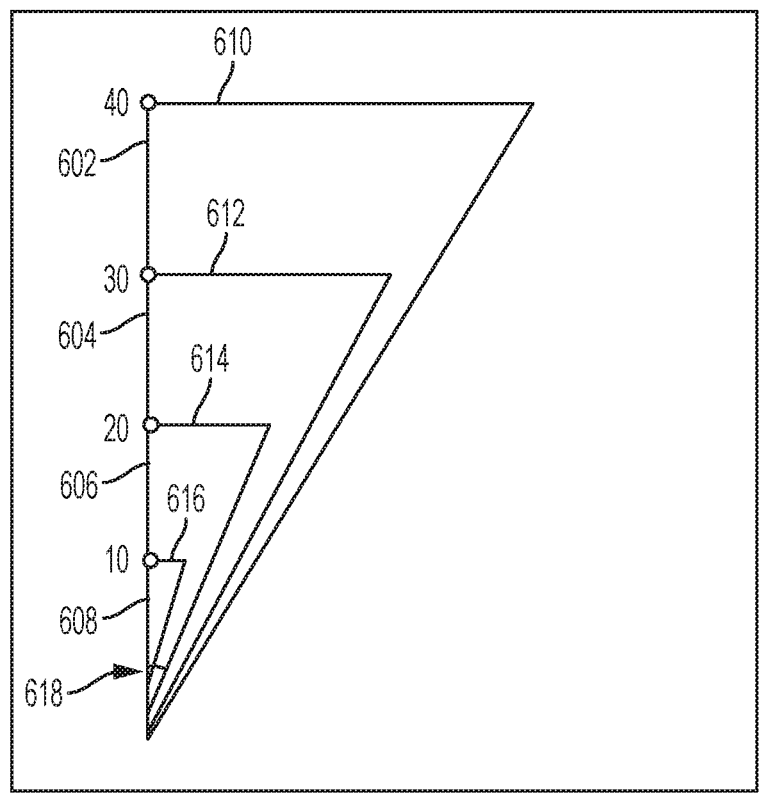
FIG. 6 show trajectories and position of a target at various ranges for a given angular rotation rate of the shooting device and image according to an embodiment of the instant disclosure.

FIG. 6 shows the basis for the analysis and display when the target range is not measured by the tracking device. This occurs when an unknown class of target or one that is quickly changing its shape makes an automated range estimate difficult or unreliable. In the generic case, when range is unknown because the image processing fails to determine size of the target, but the angular rates of the shooting device and relative movement in the sequential images is known, then various leads are required to hit the target. The figure shows a target at 4 different predefined or user input ranges of 40, 30, 20, and 10 yards 602, 604, 606, 608. When the angular rate as observed from the shooter is the same, then the target will move a distance given by the angular rate in radians X the range X (range/pellet velocity). This results in the target moving by 610, 612, 614, 616 distances.

Figure 7:
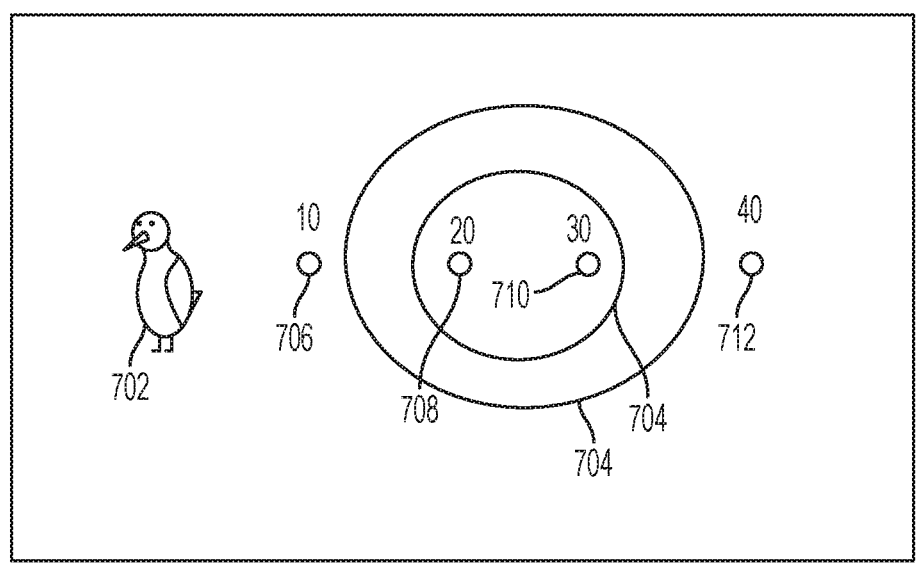
FIG. 7 shows relative positions of the shot pattern to the target when range is estimated by the shooter or not yet measured according to an embodiment of the instant disclosure.

FIG. 7 shows how this situation can be displayed to the shooter after the shot. In this figure, a target 702 is moving at some measured angular rate relative to the shooter, using the camera inertial rate and the target rate relative to the camera to determine the angular rate. At the time of the shot, the pellets will follow an expanding pattern, as defined by the choke or a user input of a pattern geometry, represented by the two circles 704 in the figure. The position of the target is represented by the four dots if it were at the 10, 20, 30, or 40 yard range from the shooter. The shooter then estimates how for the target was away from his visual observations. It is a very natural skill for a hunter to be able to judge these short ranges to the target. If the shooter estimates the range to be 20 to 30 yards away, then a hit should have occurred. If, however the shooter estimated the target was 40 yards away, then a larger lead of the target would be necessary for the next shot. Additional circles or reticles can also be used here.

In various embodiments, a device, a system, and a method comprise receiving an initial velocity of a projectile, determining a barrel position and a barrel orientation of a barrel, determining a shot pattern of the projectile in relation to at least one of time and distance and presenting the shot pattern to a user device. The embodiments further, optionally include, receiving a choke, determining the shot pattern of the projectile with distance, determining a firing of the projectile, wherein the presentation of the shot pattern is a visual display, wherein the barrel orientation comprises at least one of a barrel angle and a barrel rotation, wherein the barrel orientation is provided by at least one of a gyroscope and an accelerometer.

Embodiment 1

A device which is able to determine the position and velocity of a target and position and velocity of the shooting device at and around the time of discharge of the shooting device. The device is able to determine where the target is located in relation to the shot or shot pattern which was projected from the shooting device. The device is also able to interface with the user or other devices for the purpose of showing where the target was in relation to the shot or shot pattern, the history and or statistics of prior shots, provide a score based on information of the shot or gun in relation to the target, and share the history and or statistics and or score with others via the internet.

The positions and rates can be measured using any of the described methods above in any of the coordinate frames described above.

Embodiment 2

A device described in Embodiment 1 where the device is mounted to the gun and measures the positions and velocities of the gun using a rate sensor or inertial measurement unit. The position and velocity of the target is determined by the positions of the target as captured by a camera mounted to the gun.

Embodiment 3

A device described in Embodiment 1 where the device is worn by the user of the shooting device and measures the positions and rates of the worn device, the positions and rates of the shooting device relative to the worn device, and the positions and rates of the target relative to the worn device.

Embodiment 4

A device described in Embodiment 1 where the device is stationary and measures the positions and rates of the shooting device relative to the stationary device, and the positions and rates of the target relative to the stationary device.

Embodiment 5

The device is mounted to the gun and contains a camera and rate sensor. The orientation and rate of the gun is estimated and or measured by the rate sensor. The position and rate of the target are estimated and or measured by the camera.

Embodiment 6

The device is mounted to glasses or hat worn by the user and contains a camera and rate sensor. The orientation and rate of the device is estimated and or measured by the rate sensor. The position and rate of the shooting device are estimated by the position and change of position of the shooting device measured by the camera. The position and rate of the target are estimated and or measured by the camera.

Embodiment 7

The device is mounted to stationary stand and contains a camera. The position and rate of the shooting device are estimated by the position and change of position of the shooting device measured by the camera. The position and rate of the target are estimated and or measured by the camera.

Embodiment 8

The device is mounted to the gun and contains a camera and rate sensor. Image and sensor information is passed from the gun-mounted electronics to a computer at a remote processing location. The processed results are presented on a website that is accessed by a web browser or mobile application.

Embodiment 9

The device is mounted to the gun and contains a camera and rate sensor. Image and sensor information is passed from the gun-mounted electronics to a smartphone application for processing and display.

What is claimed is:

1. A method, comprising:
   determining a trajectory of a projectile from a shooting device by using an initial velocity of the projectile, a measured barrel position, and a barrel orientation of a barrel of the shooting device, wherein the initial velocity of the projectile comprises: a muzzle velocity of the projectile, and a measured rotational rate of the shooting device times a length of the barrel;
   determining, using images from a camera, radar or LIDAR, a target position of a physical target, a target velocity, and a projected target trajectory in relation to the barrel position and barrel orientation;
   determining an estimated target position and an estimated projectile position at a point of impact; and
   presenting the estimated target position and estimated projectile position to a user device.

2. The method of claim 1, further comprising:
   receiving information based on a choke; and
   determining a shot pattern of the projectile with distance.

3. The method of claim 2, further comprising:
uploading to a cloud storage device an overlay of the projected target trajectory, the lead position and the shot pattern.

4. The method of claim 1, wherein the presentation of the lead position is one of a visual display and audio.

5. The method of claim 1, wherein the determining a barrel orientation comprises:
identifying at least one of a barrel angle and a barrel rotation.

6. The method of claim 1, wherein the determining a barrel orientation further comprises:
receiving an input from at least one of a gyroscope and an accelerometer.

7. The method of claim 1, further comprising:
determining a range from the barrel position to the target position.

8. The method of claim 7, wherein the determining a range further comprises:
determining the range is based on at least one of a radar, sonar, laser rangefinder, and lidar.

9. A computing device, comprising:
a processor; and
a memory operably coupled to the processor, wherein the processor is configured to:
determine a trajectory of a projectile from a shooting device by using an initial velocity of the projectile, a measured barrel position, and a barrel orientation of a barrel of the shooting device, wherein the initial velocity of the projectile comprises: a muzzle velocity of the projectile, and a measured rotational rate of the shooting device times a length of the barrel;
determine, using images from a camera, radar or LIDAR, a target position of a physical target, a target velocity, and a projected target trajectory in relation to the barrel position and barrel orientation;
determine an estimated target position and an estimated projectile position at a point of impact; and
present the estimated target position and estimated projectile position to a user device.

10. The computing device of claim 9, wherein the processor further is to:
receive information based on a choke; and
determine a shot pattern of the projectile with distance.

11. The computing device of claim 10, wherein the processor further is to:
upload to a cloud storage device an overlay of the projected target trajectory, the lead position and the shot pattern.

12. The computing device of claim 9, wherein the presentation of the lead position is one of a visual display and audio.

13. The computing device of claim 9, wherein the barrel orientation comprises:
at least one of a barrel angle and a barrel rotation.

14. The computing device of claim 9, wherein the processor further is to:
identifying the barrel orientation based on an input from at least one of a gyroscope and an accelerometer.

15. The computing device of claim 9, wherein the processor further is to:
determine a range from the barrel position to the target position.

16. The computing device of claim 15, wherein the processor is to determine the range is based on at least one of a radar, sonar, laser rangefinder, and lidar.

17. A non-transitory computer readable medium having computer-executable instructions that when executed by a processor cause the processor to perform:
determining a trajectory of a projectile from a shooting device by using an initial velocity of the projectile, a measured barrel position, and a barrel orientation of a barrel of the shooting device, wherein the initial velocity of the projectile comprises: a muzzle velocity of the projectile, and a measured rotational rate of the shooting device times a length of the barrel;
determining, using images from a camera, radar or LIDAR, a target position of a physical target, a target velocity, and a projected target trajectory in relation to the barrel position and barrel orientation;
determining an estimated target position and an estimated projectile position at a point of impact; and
presenting the estimated target position and estimated projectile position to a user device.

18. The non-transitory computer readable medium of claim 17, wherein the computer-executable instructions, when executed by the processor cause the processor to perform:
receiving information based on a choke; and
determining a shot pattern of the projectile with distance.

19. The computer readable media of claim 17, wherein the barrel orientation comprises:
at least one of a barrel angle and a barrel rotation.

20. The non-transitory computer readable medium of claim 17, wherein the computer-executable instructions, when executed by the processor cause the processor to perform:
determining a range from the barrel position to the target position.

21. The non-transitory computer readable medium of claim 17, wherein the computer-executable instructions, when executed by the processor cause the processor to perform:
uploading to a cloud storage device an overlay of the projected target trajectory, the lead position and a projected shot pattern.

* * * * *